Aug. 10, 1965  H. L. CROSWHITE  3,199,297
INFINITELY VARIABLE HYDROSTATIC TRANSMISSION SYSTEM
Filed June 1, 1964  5 Sheets-Sheet 1

INVENTOR:
HOWARD L. CROSWHITE
BY
ATTORNEYS

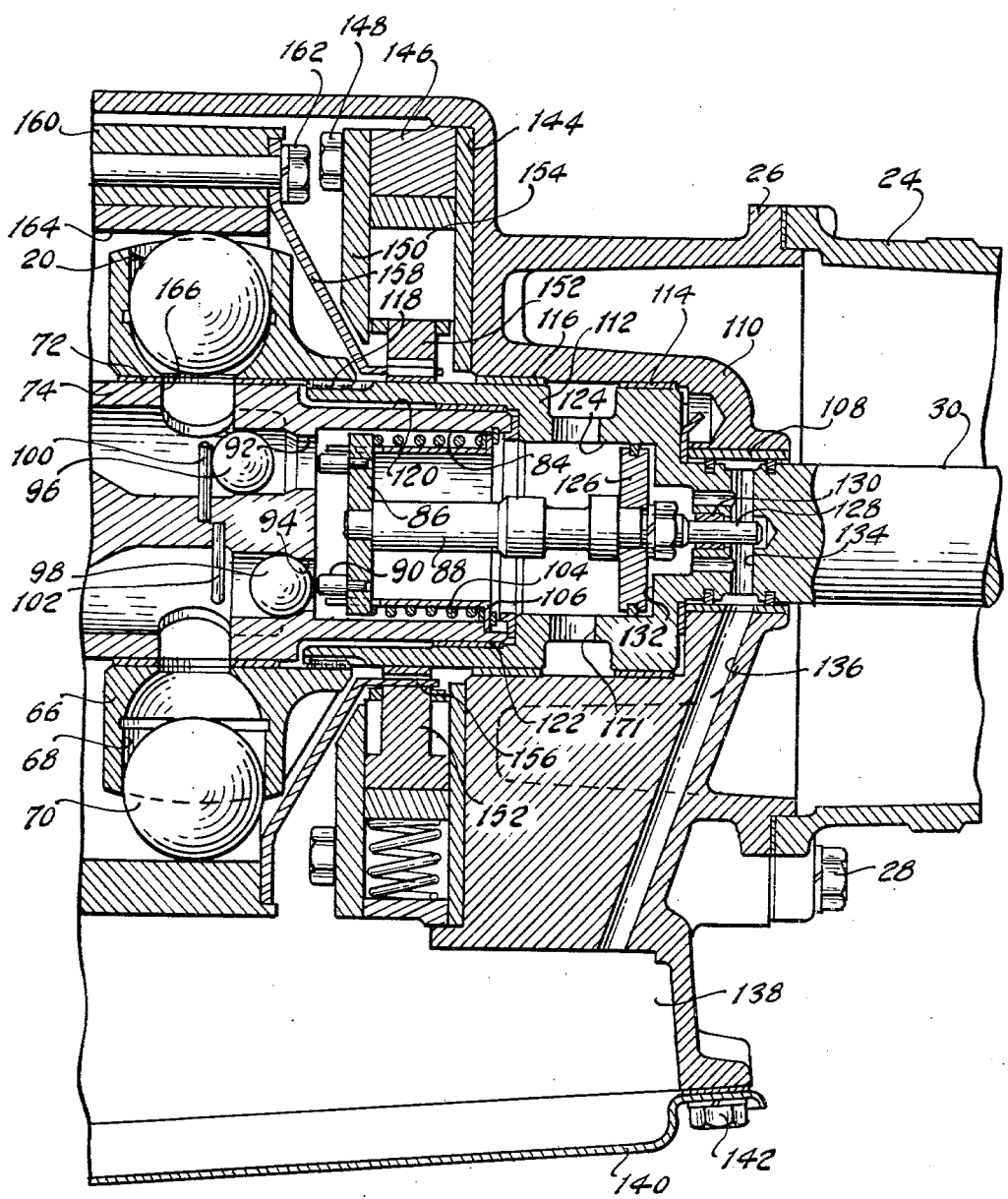

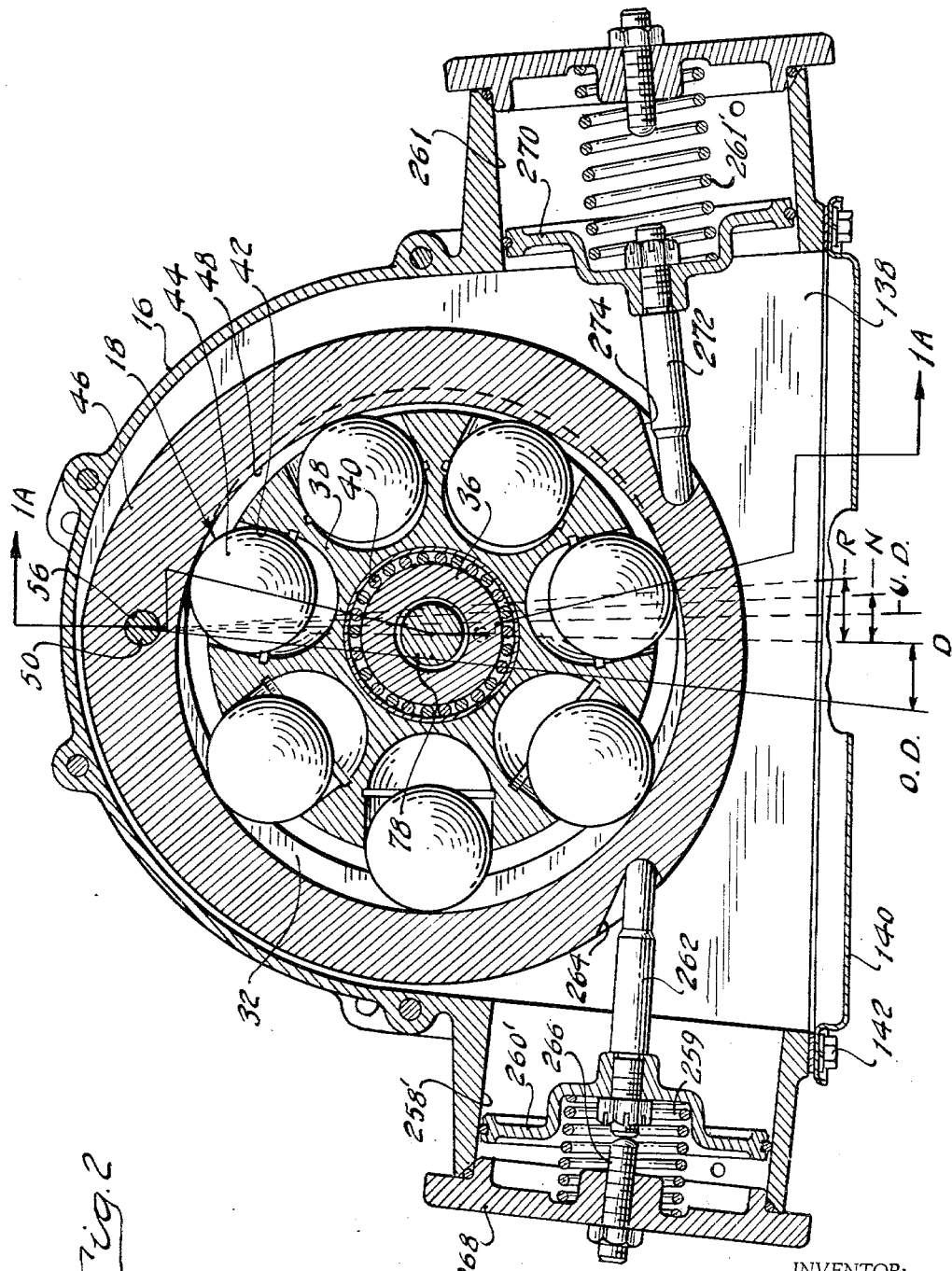

Aug. 10, 1965  H. L. CROSWHITE  3,199,297
INFINITELY VARIABLE HYDROSTATIC TRANSMISSION SYSTEM
Filed June 1, 1964  5 Sheets-Sheet 4
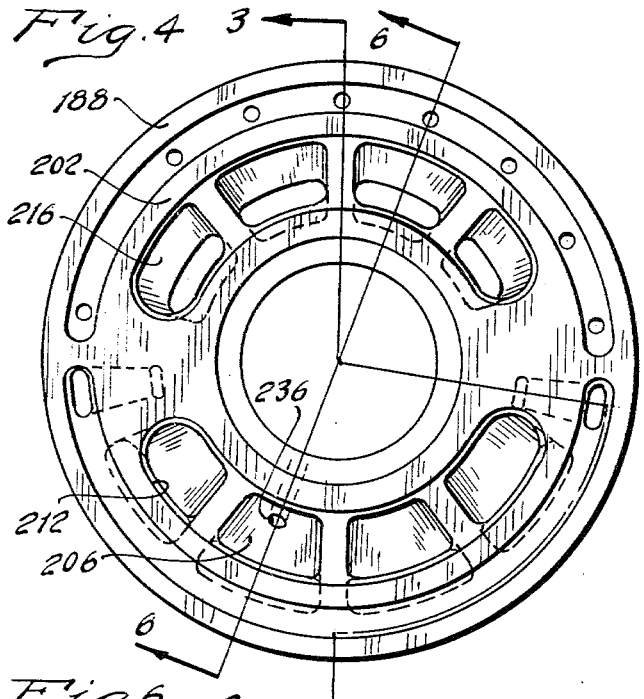
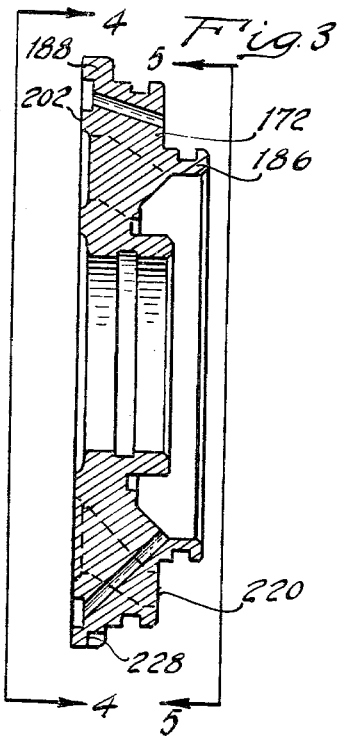
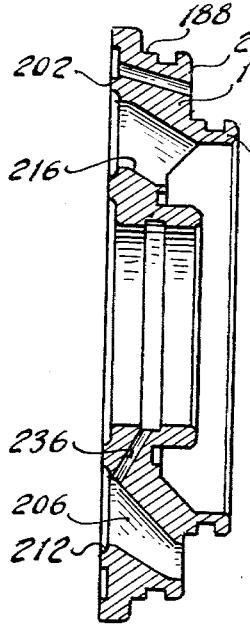
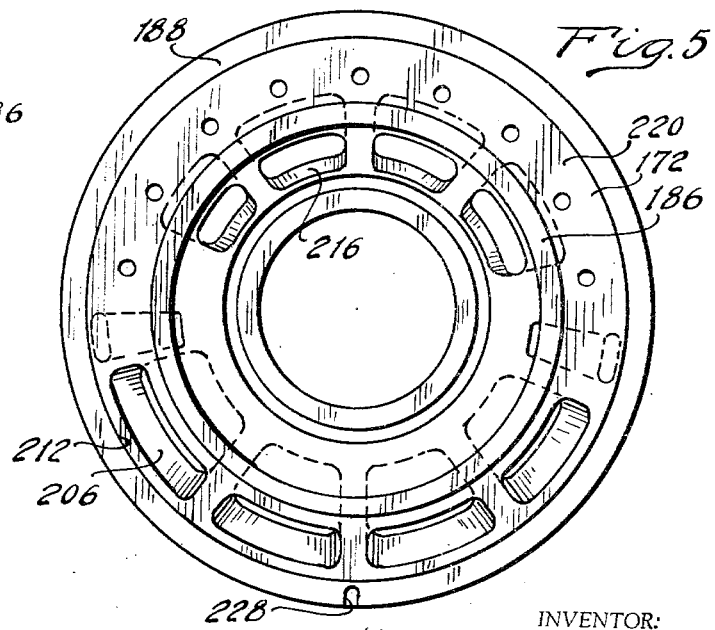
INVENTOR:
HOWARD L. CROSWHITE
BY
ATTORNEYS.

Aug. 10, 1965     H. L. CROSWHITE     3,199,297
INFINITELY VARIABLE HYDROSTATIC TRANSMISSION SYSTEM
Filed June 1, 1964     5 Sheets-Sheet 5
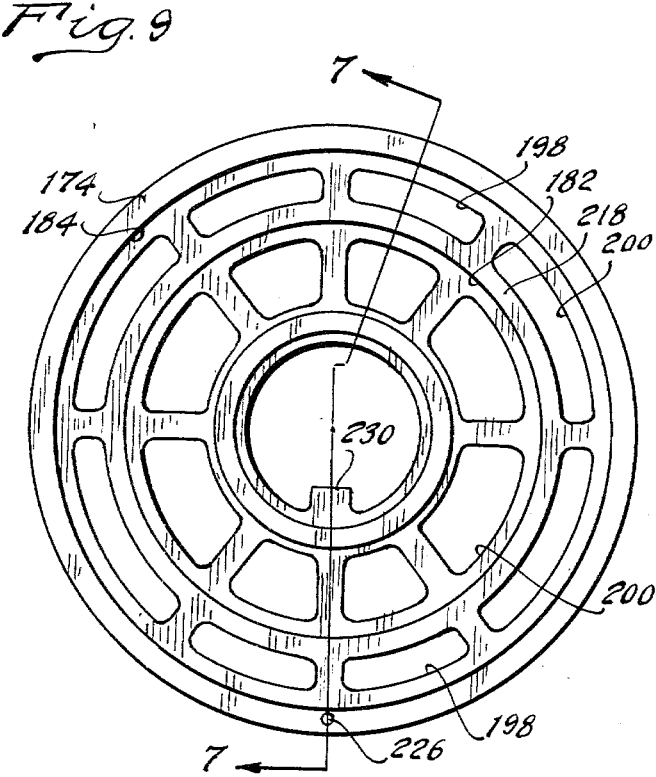
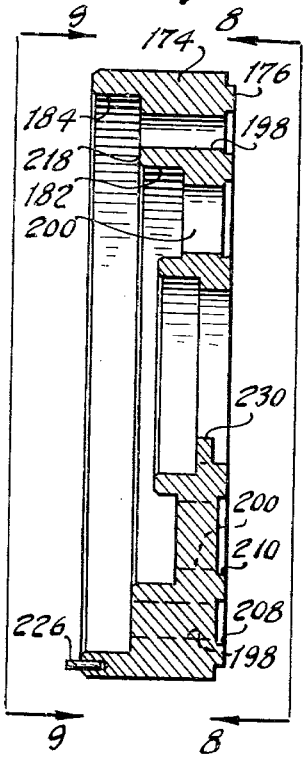
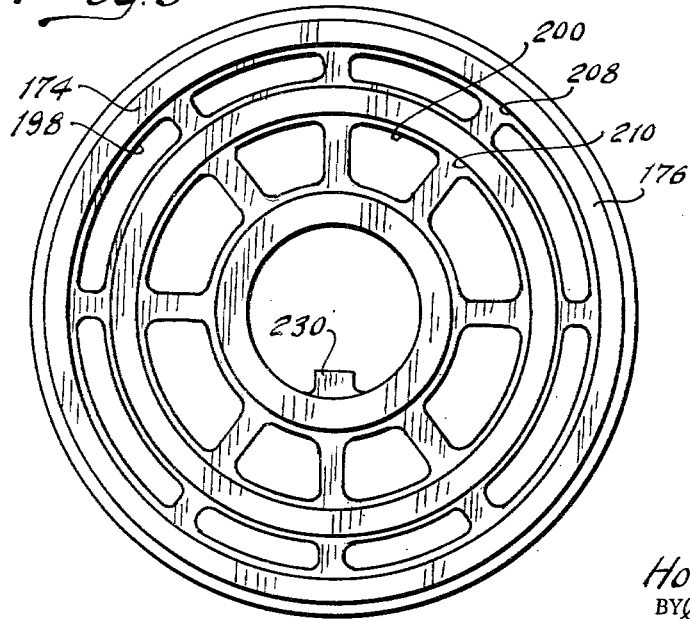
INVENTOR:
HOWARD L. CROSWHITE
BY
ATTORNEYS

United States Patent Office 3,199,297
Patented Aug. 10, 1965

3,199,297
INFINITELY VARIABLE HYDROSTATIC
TRANSMISSION SYSTEM
Howard L. Croswhite, Livonia, Mich., assignor to Ford Motor Company, Dearborn, Mich., a corporation of Delaware
Filed June 1, 1964, Ser. No. 371,575
9 Claims. (Cl. 60—53)

My invention relates generally to improvements in hydrostatic power transmission mechanisms employing fluid pump and motor units situated in a closed hydrostatic circuit. More particularly, my invention relates to a hydrostatic power transmission system employing ball piston pump and motor units wherein provision is made for varying the speed ratio by changing the fluid displacement of one unit with respect to the other.

The hydrostatic units of my invention are functionally related to each other with a hyperbolic function. That is, the over-all torque ratio that is achieved is related to the displacement ratio of the units with a hyperbolic function. Characteristically, this produces a regenerative type power path during operation with an underdrive speed ratio. The power flow path during overdrive operation is of a split torque variety, a portion of the power being distributed mechanically from the driving member to the driven member while the balance of the power is distributed hydraulically through the medium of a hydrostatic torque delivery path. During underdrive operation, the hydraulic torque delivery path acts as a medium for transferring fed back torque between the units.

The driving member of the transmission mechanism is connected mechanically to the cylinder body of a first of the hydrostatic units and to a cam race for the second hydrostatic unit, the ball piston elements of the second unit reacting against the associated cam race to provide a reaction point for the second unit. The driven member is connected mechanically to the cylinder body for the second hydrostatic unit. A corresponding cam race for the ball piston elements of the first hydrostatic unit is anchored thereby providing a torque reaction point for the system.

During operation in the underdrive range with the driven member and the cylinder body for the second hydrostatic unit running at a slower speed than the driving member, the second hydrostatic unit acts as a pump as it delivers oil under high pressure to the first hydrostatic unit. This motors the first hydrostatic unit. Since the cam race for the first hydrostatic unit is anchored, a torque multiplication then occurs. The effective torque of the first unit then is fed back to the second unit.

A fully mechanical drive between the driving member and the driven member is achieved by varying the displacement of the first hydrostatic unit to a zero displacement position. This effectively interrupts the fluid flow between the units, and the race and the cylinder body for the second hydrostatic unit then are caused to rotate in unison.

To obtain overdrive operation, the first hydrostatic unit is positioned so that it may function as a pump for delivering oil under pressure to the cylinder body for the second hydrostatic unit. That cylinder body then is driven at a speed that is greater than the driven speed of the race for the second hydrostatic unit. Thus, a split torque path is achieved. Under these conditions the expression for torque ratio is equal to $$\tau = \frac{1}{1-\delta}$$

where $$\delta = \frac{D_V}{D_C}$$

$D_V$ is the displacement of the variable hydrostatic unit, and $D_C$ is the displacement of the constant displacement hydrostatic unit. In contrast, the corresponding expression for torque ratio during underdrive operation is represented by the linear expression $\tau = 1 + \delta$.

If the displacement of the first hydrostatic unit is varied so that it is equal to the displacement for the second hydrostatic unit, the first hydrostatic unit then can accommodate the entire output of the second hydrostatic unit. Thus, a neutral condition is achieved.

To obtain reverse drive the displacement of the first hydrostatic unit is varied beyond the point at which a neutral condition is achieved. This causes the cylinder body for the second hydrostatic unit to be driven in a direction opposite to the speed of the driving member, and its absolute speed is greater than the speed of the driving member.

The provision of a hydrostatic transmission of the type above set forth being a principal object of my invention, it is a further object of my invention to provide a hydrostatic power transmission mechanism having pump and motor units situated in a closed hydrostatic circuit wherein one of the units is provided with radial-porting that communicates with radially disposed cylinders within which are situated ball piston elements, and wherein the other unit is provided with corresponding axial flow face-porting. The radial-porting defines in part a closed fluid flow path between the units. The axial flow passages for the face-porting may be sealed by means of a commutator plate with internal passage structure that is in fluid communication with the radial porting of said one hydrostatic unit. The commutator plate, which is disposed in sliding engagement with the cylinder body for the other hydrostatic unit, is adapted to accommodate misalignment that may occur due to tolerances or due to distortions of the structural members under stress during operation.

It is a further object of my invention to provide a hydrostatic pump and motor system that is characterized by a combined radial-porting and face-porting arrangement wherein provision is made for hydraulically loading the associated commutator plate to maintain it in sealing engagement with its companion cylinder body.

It is a further object of my invention to provide a system of the type above set forth wherein the communication between the radial porting and the internal passages of the commutator plate for one unit is established in part by a commutator piston element that is in sliding and sealing engagement with respect to an adjacent axial face of rotary portions of the other unit. I contemplate that the piston and the commutator plate itself will be mounted to accommodate a limited degree of floating relative motion therebetween.

It is a further object of my invention to provide an arrangement of the type above set forth wherein provision is made for hydraulically loading the piston to effect sealing engagement thereof with the adjacent face of rotary portions of the cooperating hydrostatic unit.

In an arrangement of the type above set forth it is necessary to maintain a supercharge pressure in the system to avoid cavitation and to provide a reserve supply of high pressure oil to compensate for normal leakage. In my improved arrangement I have accomplished this by providing a supercharge pump that is in fluid communication with a low pressure part of the hydrostatic unit. It is drivably connected to power input portions of the system.

A neutral condition is achieved, as explained previously, by varying the displacement of the first hydrostatic unit until it equals the displacement of the second hydrostatic unit, the cylinder body of the latter being connected to the driven member. In actual practice, however, this neutral point is rather difficult to achieve and often a certain degree of hunting occurs as the displacement varying element of the variable displacement unit overrides the neutral position and then returns. It is an object of my invention, therefore, to provide a transmission system wherein the neutral condition can be established throughout a relatively large range of displacements of the variable displacement unit on either side of the normal neutral position for the displacement varying element. I do this by providing a bypass flow valve in the system that responds to changes in output pressure of the supercharge pump to bypass working fluid from one side of the circuit to the other when the driven speed of the driving member approaches a speed corresponding to a normal engine idling speed for an automotive vehicle engine. When the valve assumes this bypass condition, the resulting short-circuit renders the hydrostatic units ineffective for torque delivery.

It is a further object of my invention to provide a hydrostatic power transmission of the type above set forth wherein provision is made for substantially reducing the overall diameter of the hydraulic units to a value that is substantially less than the corresponding diameter of conventional hydrostatic power transmission systems having comparable capacities.

Further objects and features of my invention will become apparent from the following description and from the accompanying drawings, wherein:

FIGURES 1A and 1B in longitudinal cross sectional form an assembly view of my improved mechanism;

FIGURE 2 is a tranverse cross sectional view taken along the plane of section line 2—2 of FIGURE 1 showing fluid pressure operated servos for varying the displacement of the variable displacement hydrostatic unit;

FIGURE 3 is a cross sectional detailed view of the commutator plate for the assembly of FIGURE 1 taken along the plane of section line 3—3 of FIGURE 4;

FIGURE 4 is an end view of the structure of FIGURE 3;

FIGURE 5 is another end view showing the opposite side of the commutator of FIGURE 3;

FIGURE 6 is a cross sectional view taken along the plane of section line 6—6 of FIGURE 3;

FIGURE 7 is a cross sectional detail view of the commutator piston used in the assembly of FIGURE 1 or taken along the plane of section line 7—7 of FIGURE 9;

FIGURE 8 is an end view showing one side of the commutator piston of FIGURE 7; and FIGURE 9 is an end view showing the opposite side of the commutator piston of FIGURE 7.

Figure 1A:
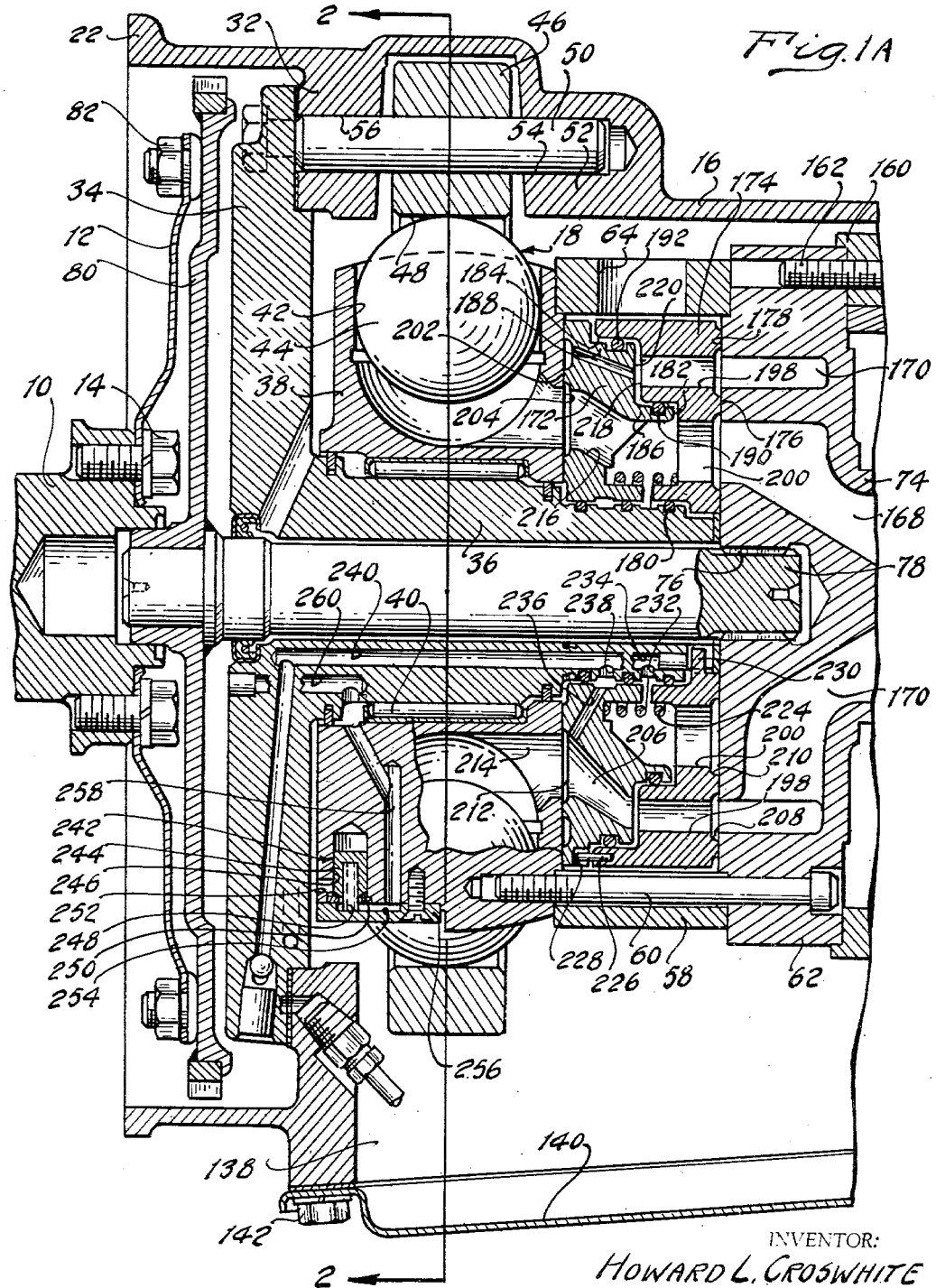

Referring first to FIGURE 1, numeral 10 designates a power input shaft that may be in the form of a crankshaft for an internal combustion vehicle engine in an automotive vehicle driveline. It is connected drivably to a flexible drive plate 12 by means of bolts 14.

A main transmission housing 16 encloses a pair of hydrostatic units designated generally by reference characters 18 and 20. A peripheral flange 22 located on one end of the housing 16 may be bored or otherwise secured to the engine block of the vehicle engine. The other end of the housing 16 has secured thereto a tailshaft extension housing 24. The end of the housing 16 is flanged at 26 to permit a bolted connection with the housing 24 by means of suitable bolts 28.

The power output shaft 30 is received within the tailshaft extension housing 34. It is end supported by means of a bushing at the extreme right-hand end of the housing 24. The shaft 30 can be connected to the vehicle traction wheels through a suitable drive shaft and a geared differential and axle assembly in known fashion.

The forward portion of the housing 16 is formed with an internal boss 32 to which is secured the periphery of a circular end plate 34. End plate 34 is provided with an axially extending support sleeve shaft 36 upon which is journaled a circular cylinder body 38 for the hydrostatic unit 18, a needle bearing assembly 40 being provided for this purpose. In a preferred embodiment of my invention the body 18 is provided with seven angularly spaced cylindrical openings 42, each opening receiving a ball piston element 44 which is adapted to reciprocate along a radial path and to rotate about a spin axis that is parallel to the axis of the unit 18.

The balls 44 are adapted to engage a cam ring 46 which is formed with an internal cam surface 48. The portion of the surface 48 that is engaged by the balls 44 is grooved thereby providing a larger area of contact than that which would be available if the surface 48 were of a uniform cylindrical form.

The ring 46 is supported by means of an anchor pin 50 which is end supported by the boss 32 and another boss 52 formed in the housing 16. The bosses 52 and 32 are formed with openings 54 and 56, respectively, for receiving the ends of the pin 50.

Upon rotation of the body 38 the balls 44 are caused to reciprocate within the cylindrical openings 42 by reason of the camming action of the cam ring 46. The fluid within the hydrostatic circuit provides lubricant for the balls 44.

The degree of eccentricity of the cam ring 46 with respect to the body 38 can be varied by means of a servo arrangement that will be described with reference to FIGURE 2.

A spacer ring 58 is bolted by means of bolts 60 to the right-hand axial face of the body 38. Secured also to the ring 58 is a rotary torque delivery member 62 which forms a part of the hydrostatic unit 20. The bolts 60 secure together the member 62, the ring 58 and the body 38 for rotation in unison. Radial exhaust ports 64 can be provided in the ring 58 to allow fluid leakage within the hydrostatic system to escape into the interior of the housing 60.

The unit 20 comprises a cylinder body 66. In a preferred form of my invention, the body 66 is formed with eight radially disposed cylindrical openings 68 within which are received ball piston elements 70. Like the balls 44, the balls 70 are adapted to reciprocate radially and to spin about a spin axis that is parallel to the axis of the unit 20.

Cylinder body 66 is rotatably journaled by means of a bushing 72 upon an axially extending hub 74 for the member 62. The member 62 is splined at 76 to a central torque delivery shaft 78 that is secured drivably to the hub of a starter ring gear disc 80. The drive plate 12 is secured by means of bolts 82 to the periphery of the disc 80 thereby establishing a driving connection between the crankshaft 10 and the shaft 78.

The right-hand end of the hub 74 is formed with a cylindrical opening 84 which receives a thrust element 86 carried by a valve actuator shaft 88. Thrust element 86 includes radially extending fingers that carry pins 90. These pins are located in alignment with valve ports 92 and 94 which communicate with the interior of the cylindrical opening 84. A ball valve element 96 is received within port 94.

As thrust element 86 is shifted in a left-hand direction, pins 90 unseat valves 96 or 98 to establish free communication between the ports 92 and 94. Communication is interrupted, however, as the thrust element 86 is withdrawn in a right-hand direction and either one or the other of the ball valve elements 96 or 98 becomes seated in its respective port.

The movement of the ball valve elements 96 and 98 in a left-hand direction is limited by anchor pins 100 and 102, respectively.

Thrust element 86 normally is urged in a left-hand direction by a compression spring 104 situated between the element 86 and a spring anchor ring 106 which is secured to the hub 74.

Shaft 30 is journaled by means of a bushing 108 within a bearing opening formed in end wall 110. This wall forms a part of the housing 16.

Shaft 10 is formed integrally with a cylindrical portion 112 which in turn is journaled by means of bushings 114 and 116 within a cooperating cylindrical opening formed in the wall 110. The left-hand extremity of the shaft portion 112 is splined at 118 to the cylinder body 66. Thus, the body 66 rotates in unison with shaft 30.

Shaft portion 112 is formed with two cylindrical openings of differential diameter. One opening 120 receives the right-hand end of the hub 74, the latter being journaled with respect to the shaft portion 112 by means of a bushing 122. The other opening in the shaft portion 112, which is indicated at 124, slidably receives a valve actuator piston 126. Secured to the piston 126 is the shaft 88. A pilot stub shaft 128 also is carried by the piston 126 and it in turn is supported by a bushing 130 received within a cooperating bearing opening formed in the shaft 30.

The fluid chamber 132 that is situated on the right-hand side of the piston 126 is in fluid communication with one or more low pressure passages 134 formed in the shaft 30. These in turn communicate with an annular groove in the shaft 30 and with a low pressure passage 136 formed in the wall 110 of the housing 16. Passage 136 may be supplied with fluid at atmospheric pressure. It communicates with an automatic control valve body, not shown, that normally would be located in the sump region 138 of the housing 16. The sump region is provided with an access opening that is covered by an oil pan 140. Bolts 142 secure the pan 140 to the lower surface of the body 16.

The body 16 is formed with an internal wall 144 to which is secured a pump adaptor ring 146, bolts 148 being provided for this purpose. A pump side plate 150 also is secured by bolts 148 to the ring 146. The plate 150 and the ring 146 cooperate to define a pump rotor chamber within which a vane pump rotor 152 is adapted to rotate. The rotor 152 may be formed with radial openings which receive vanes 154. The rotor 152 and the vanes 154 cooperate in the usual fashion with side porting to receive low pressure fluid from the pump supply source and to deliver high pressure fluid to the pump outlet passage structure. The details of the construction of the pump, of which rotor 152 and the vanes 154 form a part, need not be described since the pump functions in the same fashion as a variety of conventional vane pumps that are known to persons skilled in this art.

The rotor 152 is drivably keyed at 156 to the hub portion of the pump plate 158. This plate is secured at its periphery to a cam ring 160 for the hydrostatic unit 20, suitable bolts 162 being provided for this purpose. Cam ring 160 can be secured drivably to the member 62 by means of the bolts 162.

The balls 70 engage the inner surface 164 for the cam ring 160. This surface 164 may be grooved at the region of contact between the balls 70 and the ring 160. The axis of the cam surface 164 is eccentrically positioned with respect to the axis of the cylinder body 66. The displacement of the unit 20 for each revolution of the body 66 relative to the ring 160 is constant.

The radially inward region of each cylinder 68 is in fluid communication with a radial port 166. Internal passages, two of which are shown in FIGURE 1A at 168 and 170, are in fluid communication with the radial ports 166. During forward drive operation under torque the passages corresponding to passage 170 are under high pressure and the passages corresponding to passage 168 are under low pressure. The magnitude of this low pressure is determined by the pressure level established by the supercharge pump shown in part at 154 and 152. This pump is in fluid comunication with a supercharge pressure port 171 formed in shaft portion 112, suitable internal passage structure, not shown, being provided for this purpose. The supercharge pressure then is distributed through hub 74 and through port 92 to the region of the hydrostatic circuit for the units 18 and 20. During normal forward driving, the supercharge pressure is sufficient to urge the piston 136 in a right-hand direction against the opposing influence of spring 104. The high pressure in the passages corresponding to the passage 170 closes the associated ball valve 98.

The spacer ring 58 cooperates with the member 62 and the cylinder body 38 to provide an internal cavity. Situated within this cavity are a circular commutator plate element 172 and a commutator piston element 174. Piston element 174 is formed with a sealing surface 176 that engages slidably a flat sealing surface 178 formed on the member 62.

Piston 174 surrounds one end of the extension 36 for the end plate 34. A flexible O-ring seal 180 provides sealing action while accommodating a limited degree of floating movement of the piston 174 with respect to the extension 36.

Piston 174 is formed with stepped diameter openings 182 and 184 which respectively receive the stepped diameter of cylindrical portions 186 and 188 of the commutator element 172. A flexible oil seal ring 190 seals the commutator piston element 174 of the cylindrical portion 186 of the commutator element 172. A corresponding seal 182 is provided for the cylindrical portion 188.

Piston element 174 is formed with axial passages 194 and 200 which respectively communicate with passages 170 and 168 in the member 62.

Commutator element 172 is formed with a flat sealing surface 202 that is disposed in sliding and sealing engagement with a flat side surface 204 on the cylinder body 38. A series of high pressure passages 206 extend from the left-hand side surface 202 of the commutator element to the radially outward location on the hight-hand end surface thereof so that communication is established between passages 206 and 198. Passages 198 are in fluid communication with each other through an annular groove 208. In a similar fashion, all of the passages 200 are in fluid communication with each other through an annular groove 210.

All of the passages 206 are in fluid communication with each other through a groove 212. This groove is in fluid communication with axially extending passages 214 which extend to the radially inward region of the cylinders 42.

Commutator element 172 is formed also with a series of passages 216 which extend from one side of the element 172 to the other. They are in fluid communication with passages 200 in the piston 174. The passages 214 communicate alternately with passages 206 and 216 as the cylinder body 38 rotates about its axis.

The high pressure in passage 170 and in passages 198 acts upon the high pressure area 218 on the commutator piston element 174. This is opposed, of course, by high pressure that acts upon the relatively small area of the sealing surface 176 of the element 174. The resultant pressure force acting in a right-hand direction is sufficient to maintain the piston element 174 in sliding sealing engagement with the face 178 of the member 62. The high pressure in passage 198 acts also upon the annular area 220 formed on the commutator element 172. This area is larger than the net effective area on surface 202 upon which the high pressure acts. Thus, the net or resultant force acting upon the commutator element 172 maintains the faces 202 and 204 in sliding and sealing engagement. A spring 224 also assists in maintaining the commutator plate element and the commutator piston element in sealing engagement with their respective mating sealing surfaces.

The commutator piston element 174 is pinned to the commutator element 172 by means of a pin 226 carried by the periphery of piston element 174 and received in a slot 228 in the adjacent periphery of the commutator element 172. The hub of the piston element 174 is drivably keyer, as shown at 230, to the right-hand end of extension 36. Thus, the commutator element and the commutator piston element are held rotatably fast as the cylinder bodies for the respective hydrostatic units are rotated.

Reference may be made to FIGURES 3, 4, 5 and 6 for a detailed illustration of the construction of the commutator plate element. Reference may be made to FIGURES 7, 8 and 9 for a particular illustration of the construction of the commutator piston element.

Supercharge pressure in the passages 200 is distributed through a radial port 232 in the extension 36 and hence to a communicating supercharge pressure passage 234. Suitable internal passage structure can be provided by establishing communication between the high pressure side of the supercharge pump shown in part 152 and 154. Control pressure can be provided by means of cross flow passages 236 which communicate with a port 238 in the extension 36. These ports 238 communicate with a control pressure passage 240 which in turn is in fluid communication with an automatic control valve body, not shown.

An engine speed responsive governor valve mechanism is shown at 242. It may include a centrifugally operated valve element 244 that is slidably positioned within a radial cylinder 246. It is urged radially inwardly by valve spring 248.

A cone valve surface 250 on the element 244 controls the degree of communication between an exhaust port 252 and a control pressure passage 254 formed in an end cap 256 secured to the peripheral surface of a cylinder body 38. Passage 254 in turn communicates with a radial passage 258 and with other passage structure in the extension 36 shown in part at 260. This passage 260 communicates with the valve body, not shown, through a flow restricting orifice. The centrifugal force acting upon valve element 244 creates a back pressure in the passage structure on the downstream side of the orifice and this back pressure is utilized as an indicator of the speed of rotation of the engine.

The arrangement of the axial flow face ports for the hydrostatic unit 18 makes it possible to reduce the overall radial dimensions of the unit. Furthermore, any deflection that may occur in the stressed members of the units during operation will not create a sealing problem since the commutator plate element 172 is adapted to articulate to a limited degree with respect to the piston element 174. Thus, the commutator will be maintained in sealing engagement with the surface 204 at all times regardless of the loading that is encountered. For the same reasons the piston surface 176 is maintained in sealing engagement with surface 178 of the member 62 regardless of any deflection that may occur in the stressed members of the mechanism.

In FIGURE 2 I have illustrated a fluid pressure operated servo arrangement for adjusting the eccentricity of the cam ring 46 with respect to the axis of the hydrostatic unit 18. It comprises a pair of cylinders 258' and 261' defined by the housing.

Cylinder 258' receives a piston 260'. A piston stem 262 is secured to the piston 260' and its extended end is received within a slot 264 formed in the outer periphery of the cam ring 46. An adjustable threaded stop member 266 is received in a cylinder end cap 268 and limits the degree of travel of the piston 260' in a left-hand direction as viewed in FIGURE 2. Spring 259 normally urges piston 260' in a right-hand direction.

The cylinder 261 has a piston and stem construction that corresponds to the piston and stem construction for the cylinder 258. It includes a piston 270 and a piston stem 272 that is received within a slot 274 formed in the periphery of cam ring 46. A spring 261' urges piston 270 in a left-hand direction. As fluid pressure is admitted to the right-hand side of piston 270, as viewed in FIGURE 2, the cam ring 46 is shifted in a clockwise direction about the axis of pin 50. This corresponds to the overdrive condition. As fluid pressure is admitted to the left-hand side of piston 260', however, the cam ring 46 is shifted in the opposite direction. When it reaches the angular position designated by the symbol "D," it is conditioned for fully mechanical drive. As the ring 46 is shifted further in a counterclockwise direction to the angular position designated by the letter "N," the mechanism will assume a so-called neutral condition. At any displacement position between the positions D and N the mechanism is conditoned for underdrive operation.

As the cam ring 46 is shifted further in a counterclockwise direction toward the position designated by the letter "R," the mechanism will assume a reverse drive condition. During operation in the underdrive range the hydrostatic unit 18 acts as a motor and is supplied with high pressure fluid by the hydrostatic unit 20 which assumes the function of a pump. The hydrostatic unit 18 then reacts against the relatively stationary cam ring 46 to cause an augmentation in the effective torque made available to the cylinder body 66 of the hydrostatic unit 20. All of the flow supplied by the unit 20 then is absorbed by the unit 18 and no torque delivery takes place. At any displacement between the direct drive position of the cam ring 46 and the neutral position thereof, the unit 18 will act as a pump and the unit 20 will act as a motor. Thus, a split torque drive is established, a portion of the power being distributed mechanically and the balance being distributed hydraulically. This contributes to the high efficiency operation.

In reverse drive the passages 168 become the high pressure passages and the passages 170 become the low pressure passages. The ring 46 is displaced to the "R" position as explained previously.

If the vehicle itself is coasting and the mechanism assumes a neutral condition, the supercharge pressure made available by the pump shown in part at 152 and 154 becomes smaller. At a predetermined reduced speed the supercharge pressure is insufficient to oppose the influence of spring 104. Thus, the element 86 is shifted in a left-hand direction thereby causing the ball valves 98 and 96 to short-circuit the hydrostatic system. Torque delivery then is impossible and the mechanism assumes a neutral condition throughout a relatively large range of positions of the cam ring 46 on either side of the neutral position "N." This prevents hunting of the servos of FIGURE 2 and assists also in stabilizing the mechanism during acceleration from a standing start.

Having thus described a preferred form of my invention, what I claim and desire to secure by United States Letters Patent is:

1. A hydrostatic power transmission mechanism comprising a pair of hydrostatic fluid displacement units, each of them comprising a driving portion and a driven portion, one of the portions of one unit and one of the portions of the other unit being connected together for rotation in unison, a closed hydrostatic fluid flow path between said units for accommodating cross flow therebetween, the common portions of each unit cooperating to define a cavity, a commutator element in said cavity, a commutator piston element in said cavity, means for connecting said elements to a relatively stationary portion of said mechanism, a sealing surface formed on said commutator element, a cooperating sealing surface formed on said one portion of said one hydrostatic unit, rotary portions of said other hydrostatic unit being in sliding and sealing engagement with said commutator piston element, said hydrostatic fluid flow path being defined in part by said commutator element and said commutator piston element, and means for providing a flexible sealed connection between said commutator element and said commutator piston element whereby a continuous high pressure flow path and a continuous low pressure flow path therethrough is provided notwithstanding shifting and articulated movement of one element with respect to the other.

2. A hydrostatic power transmission mechanism comprising a pair of hydrostatic fluid displacement units, each of them comprising a driving portion and a driven portion, one of the portions of one unit and one of the portions of the other unit being connected together for rotation in unison, a closed hydrostatic fluid flow path between said units for accommodating cross flow therebetween, the common portions of each unit cooperating to define a cavity, a commutator element in said cavity, a commutator piston element in said cavity, means for connecting said elements to a relatively stationary portion of said mechanism, a sealing surface formed on said commutator element, a cooperating sealing surface formed on said one portion of said one hydrostatic unit, rotary portions of said other hydrostatic unit being in sliding and sealing engagement with said commutator piston element, said hydrostatic fluid flow path being defined in part by said commutator element and said commutator piston element, means for providing a flexible sealed connection between said commutator element and said commutator piston element whereby a continuous high pressure flow path and a continuous low pressure flow path therethrough is provided notwithstanding shifting and articulated movement of one element with respect to the other, each hydrostatic unit comprising a cylinder body, a plurality of radially disposed cylinders formed in said body, a fluid displacement piston situated in each cylinder, and a pumping piston reaction ring surrounding said body and adapted to actuate the pistons in said cylinders upon rotation of said body, said body being formed with a series of radial ports, one port communicating with each cylinder thereof, said ports being in fluid communication with and partly defining said flow path.

3. A hydrostatic power transmission mechanism comprising a pair of hydrostatic fluid displacement units, each of them comprising a driving portion and a driven portion, one of the portions of one unit and one of the portions of the other unit being connected together for rotation in unison, a closed hydrostatic fluid flow path between said units for accommodating cross flow therebetween, the common portions of each unit cooperating to define a cavity, a commutator element in said cavity, a commutator piston element in said cavity, means for connecting said elements to a relatively stationary portion of said mechanism, a sealing surface formed on said commutator element, a cooperating sealing surface formed on said one portion of said one hydrostatic unit, rotary portions of said other hydrostatic unit being in sliding and sealing engagement with said commutator piston element, said hydrostatic fluid flow path being defined in part by said commutator element and said commutator piston element, means for providing a flexible sealed connection between said commutator element and said commutator piston element whereby a continuous high pressure flow path and a continuous low pressure flow path therethrough is provided notwithstanding shifting and articulated movement of one element with respect to the other, each hydrostatic unit comprising a cylinder body, a plurality of cylinders situated in said body, ball piston elements situated in said cylinders, a reaction ring surrounding said balls and adapted to contact the same, said cam ring being adapted to reciprocate said balls within their respective cylinders upon rotation of said body, and means for varying the eccentricity of the ring for said one hydrostatic unit with respect to the geometric axis thereof thereby providing a variable relative displacement between said units.

4. A hydrostatic power transmission mechanism comprising a pair of hydrostatic fluid displacement units, each of them comprising a driving portion and a driven portion, one of the portions of one unit and one of the portions of the other unit being connected together for rotation in unison, a closed hydrostatic fluid flow path between said units for accommodating cross flow therebetween, the common portions of each unit cooperating to define a cavity, a commutator element in said cavity, a commutator piston element in said cavity, means for connecting said elements to a relatively stationary portion of said mechanism, a sealing surface formed on said commutator element, a cooperating sealing surface formed on said one portion of said one hydrostatic unit, rotary portions of said other hydrostatic unit being in sliding and sealing engagement with said commutator piston element, said hydrostatic fluid flow path being defined in part by said commutator element and said commutator piston element, means for providing a flexible sealed connection between said commutator element and said commutator piston element whereby a continuous high pressure flow path and a continuous low pressure flow path therethrough is provided notwithstanding shifting and articulated movement of one element with respect to the other, each hydrostatic unit comprising a cylinder body, a plurality of radially disposed cylinders formed in said body, a fluid displacement piston situated in each cylinder, a pumping piston reaction ring surrounding said body and adapted to actuate the pistons in said cylinders upon rotation of said body, said body being formed with a series of radial ports, one port communicating with each cylinder thereof, said ports being in fluid communication with and partly defining said flow path, the piston cylinders being in the form of balls that engage said ring, said balls being adapted to rotate about a spin axis that is parallel to the geometric axis of said body as they reciprocate radially, and means for varying the eccentricity of the ring for said one hydrostatic unit with respect to the geometric axis thereof thereby providing a variable relative displacement between said units.

5. In a hydrostatic power transmission, a first and a second hydrostatic unit situated in a closed fluid flow circuit, the discharge of one unit being received by the other unit, means for mechanically powering one unit, means for mechanically connecting driven portions of the other unit to a driven member, a fluid supercharge pump having rotary portions thereof drivably connected to a driving member, valve means for providing controlled communication between the high pressure side of said circuit and the low pressure side thereof, and means responsive to the pressure supplied by said supercharge pump to actuate said valve means to effect a bypass between said high pressure side and said low pressure side upon a decrease in the effective pressure made available by said supercharge pump to a valve less than a predetermined value relative to the pressure on the high pressure side of said circuit.

6. In a hydrostatic power transmission, a first and second hydrostatic unit situated in a closed fluid flow circuit, the discharge of one unit being received by the other unit, means for mechanically powering one unit, means for mechanically connecting driven portions of the other unit to a driven member, a fluid supercharge pump having rotary portions thereof drivably connected to a driving member, valve means for providing controlled communication between the high pressure side of said circuit and the low pressure side thereof, means responsive to the pressure supplied by said supercharge pump to actuate said valve means to effect a bypass between said high pressure side and said low pressure side upon a decrease in the effective pressure made available by said supercharge pump to a value less than a predetermined value relative to the pressure on the high pressure side of said circuit, said valve means comprising a valve port, a check valve located in said valve port, the pressure on the high pressure side of said passage means urging normally said check valve to a passage closing position, servo means for mechanically unseating said check valve comprising a spring loaded valve operator, said operator being shiftable under the influence of spring pressure toward said check valve to unseat the same, a pressure movable portion of said servo means being connected to said operator, and means for distributing supercharge pressure from said supercharge pump to said pressure movable portion to overcome the spring force on said operator when the magnitude of the supercharge pressure relative to the pressure on the high pressure side of said circuit is greater than a predetermined value.

7. A hydrostatic power transmission mechanism for delivering torque from a driving member to a driven member, a housing, first and second hydrostatic fluid displacement units located in said housing, each hydrostatic unit comprising a rotary cylinder body having formed therein radial cylinders, each cylinder having mounted for reciprocation therein a ball piston element, a stationary sleeve shaft connected to said housing, means for rotatably supporting the cylinder body for said first hydrostatic unit upon said sleeve shaft, a cam race disposed about the ball piston elements for each hydrostatic unit, the race for said second hydrostatic unit being situated in a fixed eccentric position with respect to the axis of rotation of the cylinder body for said second hydrostatic unit, means for varying the eccentricity of the race for said first hydrostatic unit with respect to the axis of rotation of the cylinder body thereof, a direct mechanical connection between the race for said second hydrostatic unit and the cylinder body for said first hydrostatic unit, a direct mechanical connection between the cylinder body for said second hydrostatic unit and said driven member, means for anchoring the race for said first hydrostatic unit to said housing thereby accommodating torque reaction, a rotary member connected to the race for said second hydrostatic unit, cross flow passage means defined by said rotary member for transferring pressure from one unit to the other, a commutator element and a commutator piston element situated between said rotary member and the cylinder body for said first hydrostatic unit, said piston element and said commutator element defining a continuation of said cross flow passage means, said commutator element being in sliding and sealing engagement with the cylinder body for said first hydrostatic unit, said piston element being in sliding and sealing engagement with the adjacent surface of said rotary member, and means for accommodating relative displacement between said commutator element and said piston element without interrupting their sealing action.

8. A hydrostatic power transmission mechanism for delivering torque from a driving member to a driven member, a housing, first and second hydrostatic fluid displacement units located in said housing, each hydrostatic unit comprising a rotary cylinder body having formed therein radial cylinders, each cylinder having mounted for reciprocation therein a ball piston element, a stationary sleeve shaft connected to said housing, means for rotatably supporting the cylinder body for said first hydrostatic unit upon said sleeve shaft, a cam race disposed about the ball piston elements for each hydrostatic unit, the race for said second hydrostatic unit being situated in a fixed eccentric position with respect to the axis of rotation of the cylinder body for said second hydrostatic unit, means for varying the eccentricity of the race for said first hydrostatic unit with respect to the axis of rotation of the cylinder body thereof, a direct mechanical connection between the race for said second hydrostatic unit and the cylinder body for said first hydrostatic unit, a direct mechanical connection between the cylinder body for said second hydrostatic unit and said driven member, means for anchoring the race for said first hydrostatic unit to said housing thereby accommodating torque reaction, a rotary member connected to the race for said second hydrostatic unit, cross flow passage means defined by said rotary member for transferring pressure from one unit to the other, a commutator element and a commutator piston element situated between said rotary member and the cylinder body for said first hydrostatic unit, said piston element and said commutator element defining a continuation of said cross flow passage means, said commutator element being in sliding and sealing engagement with the cylinder body for said first hydrostatic unit, said piston element being in sliding and sealing engagement with the adjacent surface of said rotary member, and means for accommodating relative displacement between said commutator element and said piston element without interrupting their sealing action, said rotary member having formed therein radial ports that establish communication between the radially inward region of the cylinders for said second hydrostatic unit and said cross flow passage means, the cylinder body for said second hydrostatic unit being rotatably journaled upon said rotary portion.

9. A hydrostatic power transmission mechanism comprising a pair of hydrostatic fluid displacement units, each of them comprising a driving portion and a driven portion, one of the portions of one unit and one of the portions of the other unit being connected together for rotation in unison, a closed hydrostatic fluid flow path between said units for accommodating cross flow therebetween, the common portions of each unit cooperating to define a cavity, a commutator element in said cavity, a commutator piston element in said cavity, means for connecting said elements to a relatively stationary portion of said mechanism, a sealing surface formed on said commutator element, a cooperating sealing surface formed on said one portion of said one hydrostatic unit, rotary portions of said other hydrostatic unit being in sliding and sealing engagement with said commutator piston element, said hydrostatic fluid flow path being defined in part by said commutator element and said commutator piston element, means for providing a flexible sealed connection between said commutator element and said piston element whereby a continuous high pressure flow path and a continuous low pressure flow path therethrough is provided notwithstanding shifting and articulated movement of one element with respect to the other, said commutator element and said commutator piston element being disposed in juxtaposed relationship with adjacent surfaces, and means for distributing pressure from a high pressure region of said flow path to said adjacent surfaces to ascertain the sealing action of said commutator element and said piston element.

References Cited by the Examiner

UNITED STATES PATENTS 2,176,401  10/39  Johns _____ 60—53
2,812,638  11/57  Timms _____ 60—53

SAMUEL LEVINE, *Primary Examiner.*

JULIUS E. WEST, *Examiner.*